United States Patent [19]
Raith

[11] Patent Number: 5,404,355
[45] Date of Patent: Apr. 4, 1995

[54] METHOD FOR TRANSMITTING BROADCAST INFORMATION IN A DIGITAL CONTROL CHANNEL

[75] Inventor: Alex K. Raith, Durham, N.C.

[73] Assignee: Ericsson GE Mobile Communications, Inc., Research Triangle Park, N.C.

[21] Appl. No.: 956,640

[22] Filed: Oct. 5, 1992

[51] Int. Cl.[6] ............... H04B 7/204; H04J 3/12; H04Q 7/00

[52] U.S. Cl. ............... 370/95.1; 370/110.1; 379/59; 379/63; 455/33.1; 455/38.3; 455/54.1; 455/70; 455/343

[58] Field of Search ............... 370/85.7, 95.1, 95.3, 370/110.1, 94.1, 94.2; 379/58, 63, 59; 455/33.1, 33.2, 33.4, 38.3, 53.1, 54.1, 54.2, 56.1, 68, 70, 88, 343; 340/825.44, 311.1

[56] References Cited

U.S. PATENT DOCUMENTS

| | | | |
|---|---|---|---|
| 4,399,555 | 8/1983 | MacDonald et al. | 455/33 |
| 4,713,808 | 12/1987 | Gaskill et al. | 370/94.1 |
| 4,777,633 | 10/1988 | Fletcher et al. | 370/50 |
| 4,811,420 | 3/1989 | Avis et al. | 455/51 |
| 5,051,988 | 9/1991 | Kawahigashi et al. | 370/110.1 |
| 5,081,704 | 1/1992 | Umeda et al. | 455/33.1 |
| 5,129,097 | 7/1992 | Suzuki et al. | 455/33.2 |
| 5,230,084 | 4/1993 | Nguyen | 455/38.3 |
| 5,241,542 | 8/1993 | Natarajan et al. | 455/38.3 |

OTHER PUBLICATIONS

Portions of Digital Cellular Standard, RCR STD-27A, Jan. 30, 1992.
Portions of Digital Cellular Standard, RCR STD-27B, Dec. 10, 1992.

*Primary Examiner*—Hassan Kizou
*Attorney, Agent, or Firm*—Johnson & Wortley

[57] ABSTRACT

The present invention provides a method for transmitting information on a communications channel, e.g., a digital control channel between a base station and a mobile station in a cellular system. The method includes the steps of grouping the information into a plurality of information elements, providing at least one change flag to indicate whether the value of at least one of the information elements has changed and transmitting the change flag and the information element over the communications channel.

55 Claims, 4 Drawing Sheets

| F1 | F2 | F3 | ... | ... | E1 | E2 | E3 | ... | ... |

METHOD FOR TRANSMITTING BROADCAST INFORMATION IN A DIGITAL CONTROL CHANNEL

BACKGROUND OF THE INVENTION

1. Field of the Invention

The present invention relates to wireless communication systems, and more particularly, to a method and apparatus for communicating messages over a digital control channel in a cellular radio system.

2. History of the Prior Art

In a typical cellular radio system, a geographical area, e.g., a metropolitan area, is divided into several cells, each of which is served by a base station having a limited radio coverage area. The base stations are connected to a mobile services switching center (MSC) which is, in turn, connected to the landline public switched telephone network (PSTN). Each user (mobile subscriber) in the cellular radio system is provided with a portable, pocket, hand-held or car-mounted device (mobile station) which communicates voice and/or data with a nearby base station and the MSC. The MSC facilitates communications, e.g., switches calls and controls signalling, between the mobile station and other mobile stations in the system or landline telephones in the PSTN. FIG. 1 illustrates the architecture of a conventional cellular radio system built according to the Advanced Mobile Phone Service (AMPS) standard.

In FIG. 1, an arbitrary geographic area may be seen divided into a plurality of contiguous radio coverage areas, or cells, C1–C10. While the system of FIG. 1 is, for illustration purposes, shown to include only ten cells, the number of cells may be much larger in practice. Associated with and located in each of the cells C1–C10 is a base station designated as a corresponding one of a plurality of base stations B1–B10. Each of the base stations B1–B10 includes a plurality of channel units, each comprising a transmitter, a receiver and a controller, as is well known in the art. In FIG. 1, the base stations B1–B10 are located at the center of the cells C1–C10, respectively, and are equipped with omni-directional antennas transmitting equally in all directions. In this case, all the channel units in each of the base stations B1–B10 are connected to one antenna. However, in other configurations of the cellular radio system, the base stations B1–B10 may be located near the periphery, or otherwise away from the centers of the cells C1–C10 and may illuminate the cells C1–C10 with radio signals directionally. For example, the base station may be equipped with three directional antennas, each one covering a 120 degrees sector cell as shown in FIG. 2. In this case, some channel units will be connected to one antenna covering one sector cell, other channel units will be connected to another antenna covering another sector cell, and the remaining channel units will be connected to the remaining antenna covering the remaining sector cell. In FIG. 2, therefore, the base station serves three sector cells. However, it is not always necessary for three sector cells to exist and only one sector cell needs to be used to cover, for example, a road or a highway.

Returning to FIG. 1, each of the base stations B1–B10 is connected by voice and data links to a mobile switching center (MSC) 20 which is, in turn, connected to a central office (not shown) in the public switching telephone network (PSTN) or a similar facility, e.g., an integrated system digital network (ISDN). The relevant connections and transmission modes between the mobile switching center MSC 20 and the base stations B1–B10, or between the mobile switching center MSC 20 and the PSTN or ISDN, are well known to those of ordinary skill in the art and may include twisted wire pairs, coaxial cables, fiber optic cables or microwave radio channels operating in either analog or digital mode. Further, the voice and data links may either be provided by the operator or leased from a telephone company (telco).

With continuing reference to FIG. 1, a plurality of mobile stations M1–M10 may be found within the cells C1–C10. Again, while only ten mobile stations are shown in FIG. 1, the actual number of mobile stations may be much larger in practice and will invariably exceed the number of base stations. Moreover, while none of the mobile stations M1–M10 may be found in some of the cells C1–C10, the presence or absence of the mobile stations M1–M10 in any particular one of the cells C1–C10 depends on the individual desires of each of the mobile subscribers who may travel from one location in a cell to another or from one cell to an adjacent or neighboring cell. Each of the mobile stations M1–M10 includes a transmitter, a receiver, a controller and a user interface, e.g., a telephone handset, as is well known in the art. Each of the mobile stations M1–M10 is assigned a mobile identification number (MIN) which, in the United States, is a digital representation of the telephone directory number of the mobile subscriber. The MIN defines the subscription of the mobile subscriber on the radio path and is sent from the mobile station to the MSC 20 at call origination and from the MSC 20 to the mobile station at call termination. Each of the mobile stations M1–M10 is also identified by an electronic serial number (ESN) which is a factory-set, "unchangeable" number designed to protect against the unauthorized use of the mobile station. At call origination, for example, the mobile station will send the ESN to the MSC 20. The MSC 20 will compare the received ESN to a "blacklist" of the ESNs of mobile stations which have been reported to be stolen. If a match is found, the stolen mobile station will be denied access.

Each of the cells C1–C10 is allocated a subset of the radio frequency (RF) channels assigned to the entire cellular system by the concerned government authority, e.g., the Federal Communications Commission (FCC) in the United States. Each subset of RF channels is divided into several voice or speech channels which are used to carry voice conversations, and at least one paging/access or control channel which is used to carry supervisory data messages, between each of the base stations B1–B10 and the mobile stations M1–M10 in its coverage area. Each RF channel comprises a duplex channel (bidirectional radio transmission path) between the base station and the mobile station. The RF consists of a pair of separate frequencies, one for transmission by the base station (reception by the mobile station) and one for transmission by the mobile station (reception by the base station). Each channel unit in the base stations B1–B10 normally operates on a preselected one of the radio channels allocated to the corresponding cell, i.e., the transmitter (TX) and receiver (RX) of the channel unit are tuned to a pair of transmit and receive frequencies, respectively, which is not changed. The transceiver (TX/RX) of the each mobile station M1–M10, however, may tune to any of the radio channels specified in the system.

Depending on capacity needs, one cell may have 15 voice channels, while another may have over a 100 voice channels, and corresponding channel units. Generally speaking, however, there is only one control channel (CC) in each omnidirectional or sector cell served by a base station, i.e., a base station serving an omnidirectional cell (FIG. 1 ) will have one control channel unit while a base station serving three sectors cells (FIG. 2) will have three control channel units. The RF (control and voice) channels allocated to any given cell may be reallocated to a distant cell in accordance with a frequency reuse pattern as is well known in the art. To avoid radio interference, all radio channels in the same cell will operate on different frequencies and, furthermore, the radio channels in any one cell will operate on a set of frequencies which is different from that used in any neighboring cell.

When in the idle state (not in the conversation state), each of the mobile stations M1-M10 tunes to and then continuously monitors the strongest control channel (generally, the control channel of the cell in which the mobile station is located at that moment) and may receive or initiate a telephone call through the corresponding one of the base stations B1-B10 which is connected to the mobile switching center MSC 20. When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels in operation in the cellular system (in the United States, there are 21 "dedicated" control channels in each AMPS system, i.e., their TX/RX frequencies are predefined and cannot be changed, which means that the mobile station has to scan a maximum number of 21 channels to find the "best" control channel). When a control channel with good reception quality is found, the mobile station remains tuned to this channel until the quality deteriorates again. In this manner, all mobile stations are always "in touch" with the system.

While in the idle (standby) state, each of the mobile stations M1-M10 continuously determines whether a page message addressed to it has been received over the control channel. When, for example, an ordinary (landline) subscriber calls one of the mobile subscribers, the call is directed from the PSTN to the MSC 20 where the dialed number is analyzed. If the dialed number is validated, the MSC 20 requests some or all of the base stations B1-B10 to page the called mobile station throughout their corresponding cells C1-C10. Each of the base stations B1-B10 which receive the request from the MSC 20 will then transmit over the control channel of the corresponding cell a page message containing the MIN of the called mobile station. Each of the idle mobile stations M1-M10 will compare the MIN in the page message received over the control channel being monitored with the MIN stored in the mobile station. The called mobile station with the matching MIN will transmit a page response over the control channel to the base station which forwards the page response to the MSC 20.

Upon receiving the page response, the MSC 20 selects an available voice channel in the cell from which the page response was received and requests the base station in that cell to order the mobile station via the control channel to tune to the selected voice channel (the MSC keeps a list of all of the channels in its service area and their status, i.e., free, busy, blocked, etc., at any time). A through-connection is established once the mobile station has tuned to the selected voice channel. When, on the other hand, a mobile subscriber initiates a call, e.g., by dialing the telephone number of an ordinary subscriber and pressing the "send" button on the telephone handset in the mobile station, the MIN and ESN of the mobile station and the dialed number are sent over the control channel to the base station and forwarded to the MSC 20 which validates the mobile station, assigns a voice channel and establishes a through-connection for the conversation as before.

If the mobile station moves between cells while in the conversation state, a "handoff" of the call from the old base station to the new base station will take place. The MSC selects an available voice channel in the new cell and then orders the old base station to send to the mobile station on the current voice channel in the old cell a handoff message which informs the mobile station to tune to the selected voice channel in the new cell. The handoff message is sent in a "blank and burst" mode which causes a short but hardly noticeable break in the conversation. Upon receipt of the handoff message, the mobile station tunes to the new voice channel and a through-connection is established by the MSC via the new cell. The old voice channel in the old cell is marked idle in the MSC and may be used for another conversation.

In addition to call originations and page responses, an AMPS mobile station may access the cellular system for registrations. Two types of registrations are possible in AMPS: (i) periodic registration which is based on time or, more specifically, on the REGID value ("current time") and REGINCR value ("registration period") transmitted by the base station and the NXTREG value ("wake-up time") stored in the mobile station, and (ii) system area registration which is based on location or, more specifically, on the system identification (SID) transmitted in the serving cellular system. Periodic registration may be used to determine whether a mobile station is active (within radio range and switched on) or not in a cellular system. System area registration may be used to determine when a mobile station has crossed the border from one cellular system to another.

Upon receipt of a REGID message on the forward control channel (base station to mobile station), if registration is enabled in the serving cellular system, the mobile station compares the REGID value to the NXTREG value and compares the last received SID value with the value of the SID of the cellular system in which the mobile station last registered. If either the value of REGID is greater or equal to the value of NXTREG indicating that periodic registration is due, or the value of the last received SID is different than the value of the last stored SID indicating that the mobile station has travelled from one cellular system to another since the last successful registration, the mobile station will automatically send a registration access message over the reverse control channel (mobile station to base station) and will update the NXTREG value with the sum of the last received REGID value and REGINCR value, after receipt of a registration acknowledgement message on the forward control channel (the mobile station also updates the NXTREG value after each call origination or page response).

The conventional AMPS system described above uses frequency division multiplexing (FDM) to carry telephone conversations and control information over the voice and control channels. As mentioned, the available frequency spectrum is divided among the cells in the system. In each cell, the voice (analog) signals and data (digital) signals form the input signals to a transmitter (in the base station or the mobile station) which generates a sinusoidal carrier wave having a constant frequency corresponding to one of the frequencies allocated to the cell. The transmitter uses the input signals to modulate a characteristic (amplitude, frequency or phase) of the carrier wave prior to radio transmission. The modulated carrier occupies a relatively narrow region (channel bandwidth) of the spectrum about a nominal center frequency (the unmodulated carrier frequency). Generally, frequency modulation is used so that the carrier frequency at any instant of time is varied (increased or decreased) in proportion to the amplitude of the input signal at that instant. The resulting deviation of the modulated carrier wave frequency about the unmodulated (center) frequency is normally limited within a certain bandwidth, e.g., 30 KHz, to avoid overlapping adjacent RF channels and causing adjacent channel interference.

In the conventional AMPS system, therefore, an analog speech signal modulates the carrier wave used for transmission over the RF channel. The AMPS system uses analog frequency modulation (FM) and is a single-channel-per-carrier (SCPC) system, i.e., one voice circuit (telephone conversation) per RF channel. Recent developments, however, have ushered in a new digital era for cellular communications. The main driving force behind the switch to digital has been the desire to increase spectrum efficiency to meet the ever-increasing demands on system capacity. By encoding (digitizing and compressing) and multiplexing speech from several voice circuits prior to modulation and transmission, a single RF voice channel may be shared by several digital speech channels instead of being occupied by only one analog speech channel. In this manner, the channel capacity and, consequently, the overall system capacity, may be increased dramatically without increasing the bandwidth of the voice channel. As a corollary, the cellular radio system is able to serve a substantially greater number of mobile stations at a significantly lower cost, e.g., a smaller number of channel units (transceivers) required in the base stations. Furthermore, the digital format facilitates integration of the cellular system with the emerging digital network.

In the United States, the effort to "go digital" has been spearheaded by the Electronics Industries Association (EIA) and the Telecommunication Industry Association (TIA) which have formulated an interim standard for the air interface in digital cellular systems. This EIA/TIA interim standard is known as the "Dual-Mode Mobile Station—Base Station Compatibility Standard" and is designated as "IS-54" (copies of the various revisions of IS-54 may be obtained from the Electronics Industries Association; 2001 Pennsylvania Avenue, N.W.; Washington, D.C. 20006). The term "dual-mode" refers to the capability of the system to operate in either an analog or digital mode. The analog mode of operation draws on the EIA/TIA 553 standard which is based on the AMPS standard. The digital mode of operation relies on time division multiplexing (TDM) techniques similar to those which have long been used in the land-line telephone network to carry multiple telephone conversations simultaneously over one physical channel (code division multiplexing (CDM) has also been proposed for cellular systems, but the current IS-54-B (Rev. B) specification uses TDM).

In the wire-line telephone network, analog speech signals transmitted by local telephone subscribers over separate analog channels to the local telephone company (telco) central office are sequentially sampled and the amplitudes of the samples are quantized and then encoded into binary numbers represented by constant amplitude pulses in a process called pulse code modulation (PCM). A predetermined number of PCM channels (digital speech channels) are transmitted in a series of frames, each containing a burst of information (coded samples) from each of the PCM channels. The bursts from the different PCM channels occupy different time slots (time intervals) in each frame transmitted on the physical channel, e.g., copper wire plant. Most long-distance telephone calls are transmitted through the switching hierarchy using TDM. This technique can also be applied to transmissions on the RF channels of a cellular radio system.

An RF channel operating in TDM is divided into a series of repeating time slots each containing a burst of information from a different data source, e.g. a source coder for a voice channel. The time slots are grouped into frames of a predetermined duration. The number of time slots per frame varies depending on the number digital channels sought to be accommodated on the RF channel given the coding rates of the digital channels, the modulation level and the bandwidth of the RF channel. Each slot in a frame normally represents a different digital channel. The length of each TDM frame on the RF channel, therefore, is the minimum amount of time between two repeating time slots which are used by the same digital channel (assigned to the same user).. In other words, each TDM frame consists of no more than one s lot for each user.

According to IS-54, each digital TDM RF channel can carry from three to six digital speech channels (three to six telephone conversations) depending on the source rate of the speech coder used for each digital channel (the modulation level and channel bandwidth are set in IS-54). The speech coder for each digital traffic channel (DTC) can operate at either full-rate or half-rate (full-rate speech coders are expected to be used in the near future until half-rate coders are developed which produce acceptable speech quality). A full-rate DTC requires twice as many time slots in a given time period as a half-rate DTC. In IS-54, each TDM RF channel can carry up to three full-rate DTCs or six half-rate DTCs.

The TDM RF channel frame structure for IS-54 is shown in FIG. 3. Each "frame" on the TDM RF channel comprises six equally sized time slots (1–6) and the length of the frame is 40 ms (25 frames per second). Each full-rate DTC uses two equally spaced slots of the frame shown in FIG. 3, i.e., slots 1 & 4, or slots 2 & 5, or slots 3 & 6. When operating at full-rate, the TDM RF channel may be assigned to three users (A–C), i.e., user A is assigned to slots 1 & 4; user B is assigned to slots 2 & 5; and user C is assigned to slots 3 & 6 of the "frame" shown in FIG. 3 (for full-rate, therefore, each TDM frame actually consists of three slots and not six slots, and is 20 ms long and not 40 ms long). Each half-rate DTC uses one time slot of the frame shown in FIG. 3. At half-rate, the TDM RF channel may be assigned to six users (A–F) with each of the users A–F being assigned to one of the six slots of the frame shown in FIG. 3 ( for half-rate, each TDM frame actually consists of six slots and coincides with the definition of "frame" in IS-54).

Hence, unlike an analog FDM cellular system in which the base station and the mobile station transmit and receive continuously over an RF channel, a TDM cellular system operates in a buffer and burst discontinuous transmission mode. Each mobile station transmits (and receives) in an assigned slot on the RF channel. At full rate, for example, the mobile station of user A would transmit on slot 1, hold for slot 2 receive in slot 3, transmit in slot 4, hold for slot 5, and transmit in slot 6, and then repeat the cycle (the transmit and receive slots are offset from each other to avoid using duplexer circuitry which would otherwise be needed to allow the transmitter and receiver at the mobile station to operate simultaneously). The mobile station, therefore, transmits (or receives ) in a fraction of the time (one third for full rate and one sixth for half-rate) and can be switched off to save power the rest of the time.

The present IS-54 standard, however, is not a fully digital standard but a hybrid analog-digital standard which is intended to be followed in the transition phase from analog to digital where the mobile stations in operation will constitute a mixture of new dual-mode mobile stations and old strictly analog mobile stations. More specifically, the IS-54 standard provides for both analog speech channels in the tradition of AMPS and digital speech channels which are configured in the frame format shown in FIG. 3. At call set-up, the dual -mode mobile stations may be assigned either an analog voice channel (an entire carrier frequency) or, alternatively, a digital traffic channel (a repeating time slot on a carrier frequency). The analog-only mobile stations, however, can only be assigned an analog voice channel.

The continued need to serve existing analog-only mobile stations has also led to the specification in IS-54 of an analog control channel which has been inherited from the prior AMPS, or equivalently, EIA/TIA 553 standard. According to IS-54, the forward (paging) analog control channel on the down-link from the base station to the mobile stations carries a continuous data stream of messages (words) in a particular format. The reverse (access) analog control channel on the up-link from the mobile stations to the base station, however, is a random access channel which is used on a contention basis for transmission of call origination, page response and registration messages. A busy-idle bit transmitted on the forward control channel (FOCC) indicates the current status (availability) of the reverse control channel (RECC), i.e. , the RECC is busy if the busy-idle bit is equal to "0" and idle if the busy-idle bit is equal to "1."

The format of the FOCC specified in IS-54 is shown in FIG. 4. Several different types ( functional classes) of messages may be transmitted on the FOCC: (i) system parameter overhead message (SPOM), (ii) global action overhead message (GAOM), (iii) registration identification message (REGID), (iv) mobile station control message, e.g., paging message, and (v) control-filler message. The SPOM, GOAM and REGID are overhead messages which are intended for use by all mobile stations in the coverage area of the base station. Overhead messages are sent in a group called an overhead message train (OMT). The first message of each OMT must always be the SPOM which is transmitted every 0.8±0.3 seconds.

The SPOM consists of two words which contain information about the serving cellular system including the system identification (SID) and control bits REGH and REGR which indicate whether registration is enabled for home stations and roaming stations, respectively (a home station is a mobile station which is operating in the cellular system from which service is subscribed while a roaming station is a mobile station which is operating in a cellular system other than the one from which service is subscribed). The GOAM or REGID consists of one word which is appended at the end of the SPOM and sent on an as-needed basis. Any number of global action messages may be appended to a SPOM as desired. The types of global action messages include rescan paging channels and registration increment (REGINCR) messages (REGINCR and REGID messages control the frequency of periodic registrations of mobile stations with the serving cellular system). When sent, the REGID message must be appended to the SPOM or, if any global action messages are sent, to the last GOAM in the OMT.

While the SPOM, GOAM and REGID are broadcast for use by all mobile stations listening to the forward control channel (FOCC), the mobile station control message, e.g., paging message, is directed to a specific mobile station (specific MIN). Other examples of mobile station control messages include analog voice channel or digital traffic channel (full-rate or half-rate) assignment messages and orders to change transmit power level. The mobile station control message consists of from one to four words. The control-filler message consists of one word which is sent whenever there is no message to be sent on the FOCC, i.e., to fill gaps between different messages or between blocks of a multi-word message.

The format of the forward analog control channel specified in IS-54 and shown in FIG. 4 is largely inflexible and not conducive to the objectives of modern cellular telephony including the extension of mobile station battery life. Specifically, the time interval between SPOM transmissions is fixed and the order in which overhead and control messages are appended to the SPOM is also rigid. While the cellular system can control the frequency of transmission of most overhead messages (only the SPOM needs to be included in each OMT), an idle mobile station which has tuned to the FOCC must repeatedly read all the messages in each OMT (except, for example, when a GOAM instructs the mobile station to rescan paging channels) not only the paging messages, even though the information contained in the overhead messages in the current OMT may not have changed from the previous OMT. Too often, therefore, the mobile station updates its memory with the same information which is already stored there. Battery power is wasted during these read cycles without any commensurate benefit to the operation of the mobile station.

In light of these drawbacks and shortcomings of the prior art analog control channel (ACC), it is an object of the present invention to provide a digital control channel (DCC) which may carry message types similar to those carried on the ACC, but in which the frequency of message transmission by the base station is mostly decoupled from the frequency of message reading by the mobile station. In other words, some types of messages may be transmitted more frequently than others but the mobile station does not have to read every message transmitted on the DCC.

For example, a mobile station which has just locked on to the DCC may need to obtain, as quickly as possible, all relevant information about the current serving system, e.g., ownership (is it a private system?), service profile (can it handle a particular data service?), system parameters (what is the maximum mobile station transmit power?), etc. This overhead information, therefore, may be sent as often as possible without unduly limiting the capacity of the DCC to carry other messages, e.g., paging messages. However, most of this overhead information does not change very often and it would be a waste of battery power for this information to be read too often. Hence, once the mobile station has read the overhead information, the mobile station will not read it again until the mobile station receives an indication that it has changed. This results in significant savings of battery power in the mobile station.

It is another object of the present invention to provide a DCC which enables a mobile station in idle mode to read a minimum amount of information from the DCC during predetermined periods of time, and to enter into a "sleep" mode at all other times. In this regard, the mobile station is allowed as short of a period as possible to read paging messages before returning to sleep mode. During sleep mode, most electronic circuits in the mobile station are shut off and there is minimal drain of battery power. In this manner, the battery life may be extended from, for example, 13 hours to 100 hours before recharging of the battery becomes necessary. The proportion of time spent reading page messages to the time spent in sleep mode is controllable and represents a tradeoff between call set-up delay and battery power consumption.

It is yet another object of the present invention to provide a flexible DCC format which is adaptable to a hierarchial cell structure consisting of both "macro" (large radius) cells and "micro" (small radius) cells. In a hierarchial cell structure, a mobile station may change cells much more often than in present macro-cell oriented systems. It is important that frequent cell selection and reselection does not hamper the ability of the mobile station to receive pages or place calls. The present invention allows for fast cell selection and reselection by transmitting overhead messages on a frequent basis while still providing for efficient sleep mode operation. The high repetition frequency of overhead messages allows mobile stations which are about to lock onto a new cell to quickly find the paging channel and the other parameters required for system access.

It is a further object of the present invention to provide the ability to adjust DCC capacity in each cell to meet the usage requirements in that cell, i.e. , the expected number of pages and accesses per second.

It is another object of the present invention to provide a DCC which facilitates the integration of the mobile network with the ever-growing portfolio of ISDN services.

It is also an object of the present invention to provide a DCC which may be easily implemented within the existing framework of IS-54.

SUMMARY OF THE INVENTION

The present invention provides a method for transmitting information on a communications channel, e.g., a digital control channel between a base station and a mobile station in a cellular system. The method includes the steps of grouping the information into a plurality of information elements, providing at least one change flag to indicate whether the value of at least one of the information elements has changed and transmitting the change flag and the information element over the communications channel. The information element is read only if a change is indicated by the change flag. In this manner, the frequency at which information is transmitted is decoupled from the frequency at which the information is read. Hence, the receiver can be turned off for extended periods of time to minimize power consumption.

In another aspect, the present invention provides a method for communicating information over a channel which is divided into a plurality of subchannels. The method includes the steps of transmitting at least one portion of the information in at least one of the subchannels, transmitting at least one change flag in at least one of the subchannels to indicate when the information portion changes, receiving the information portion and the change flag, and reading the information portion in response to an indication in the change flag.

BRIEF DESCRIPTION OF THE DRAWINGS

The present invention will be better understood and its numerous objects and advantages will become apparent to those skilled in the art by reference to the following drawings in which.

DETAILED DESCRIPTION

The main thrust of the present invention is to decouple the overhead message transmission frequency from the requirement that a mobile station read all overhead information. With the digital control channel (DCC) of the present invention, the system can send overhead messages at a sufficiently high frequency to adequately serve the mobile stations which are about to lock onto the DCC without negatively affecting the mobile stations which are already locked onto the DCC.

In the embodiment described herein, the DCC of the present invention uses time division multiplexing (TDM) and, therefore, is configured as a series of time slots of a particular duration (the DCC may also use code division multiplexing but, for purposes of the description herein, TDM is assumed). In general, any suitable slot format may be used to implement the teachings of the present invention. For practical considerations, however, it is preferable to use a DCC format which is compatible with the digital traffic channel (DTC) format defined in IS-54, i.e., equally sized slots each having a duration of 6.66 ms (according to IS-54, three slots span 20 ms). In other words, the basic unit for both the DCC and DTC will be a 6.66 ms slot.

Selection of the IS-54 format for the herein described embodiment of the present invention avoids (i) the technical complexity required for the base stations and mobile stations to handle two different sets of slot formats, source coding rates, and signaling protocols (interleaving, channel coding, synchronization, error detection, etc. ), one set for the DCC and another set for the DTC, and (ii) the necessity of using a separate carrier for the DCC, since both the DTC and the DCC may be provided on the same carrier. The former feature facilitates the rapid development and introduction of IS-54-compatible commercial products (base stations and mobile stations) which operate on the DCC and DTC. The latter feature is particularly important in the context of a small cell which is provided with a small number of carriers or, perhaps, with only one carrier.

Thus, the justification for using a 6.66 ms slot for the DCC lies in compatibility and complexity considerations. To be able to mix DCC and IS-54 DTC slots on the same carrier, the DCC slot duration should not be longer than a DTC slot. From a technical complexity standpoint, the design and testing of mobile stations would be simplified if the DCC slot and the DTC slot are made equal. Absent a compelling need to use a DCC slot which is shorter than the DTC slot, the DCC and DTC slots should have the same duration, i.e., 6.66 ms.

Figure 5:
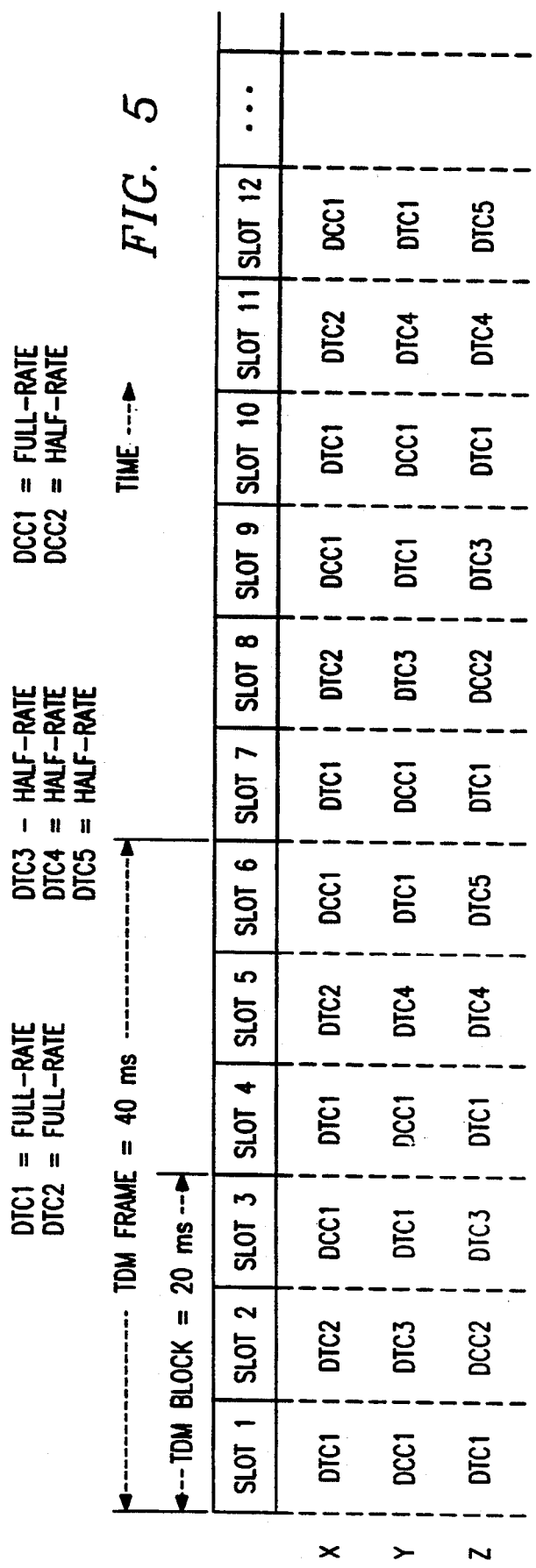
FIG. 5 shows the format of the TDM stream on one RF carrier which can carry at least one digital traffic channel (DTC) according to this standard and the digital control channel (DCC) according to the present invention.

Referring now to FIG. 5, the format of the TDM stream on one carrier which can carry at least one DTC according to IS-54, and the DCC according to the present invention, may now be seen. As explained heretofore, the DTC specified in IS-54 may operate in either full-rate or half-rate. A full-rate DTC occupies one slot every 20 ms (2 slots every 40 ms) while a half-rate DTC occupies one slot every 40 ms. The carrier can carry up to three full-rate DTCs or six half-rate DTCs, or any combination in-between, e.g., one full-rate and four half-rate DTCs.

Like the DTC, the DCC of the present invention may also operate in either full-rate or half-rate (with respect to the DCC, as distinguished from the DTC, the terms "full-rate" and "half-rate" refer to the selected transmission rate rather than the source rate of the speech coders—in general, it may be said that a "full-rate" channel, whether a DCC or a DTC, requires twice as many slots per unit time as a "half-rate" channel). Hence, a number of alternative digital channel (DCC and DTC) combinations are possible within the TDM stream depending on whether the DCC(s) and DTC(s) impressed on the carrier operate in full-rate or half-rate. FIG. 5 shows three alternative digital channel combinations, namely, alternatives X, Y and Z, which may be defined on a certain carrier.

According to alternative X, two full-rate DTCs (DTC1 and DTC2) and one full-rate DCC (DCC1) are time division multiplexed on the carrier. In alternative X, the bursts from DTC1 are transmitted in slots 1, 4, 7, 10 and so on; the bursts from DTC2 are transmitted in slots 2, 5, 8, 11 and so on; and the bursts from DCC1 are transmitted in slots 3, 6, 9, 12 and so on.

According to alternative Y, one full-rate DTC (DTC 1), two half-rate DTCs (DTC3 and DTC4) and one full-rate DCC (DCC1) are time division multiplexed on the carrier. In alternative Y, the bursts from DCC1 are transmitted in slots 1, 4, 7, 10 and so on; the bursts from DTC3 are transmitted in slots 2, 8 and so on; the bursts from DTC1 are transmitted in slots 3, 6, 9, 12 and so on; and the bursts from DTC4 are transmitted in slots 5, 11 and so on.

According to alternative Z, one full-rate DTC (DTC1), three half-rate DTCs (DTC3, DTC4 and DTC5) and one half-rate DCC (DCC2) are time division multiplexed on the carrier. In alternative Z, the bursts from DTC1 are transmitted in slots 1, 4, 7, 10 and so on; the bursts from DCC2 are transmitted in slots 2, 8 and so on; the bursts from DTC3 are transmitted in slots 3, 9 and so on; the bursts from DTC4 are transmitted in slots 5, 11 and so on; and the bursts from DTC5 are transmitted in slots 6, 12 and so on.

As will be readily appreciated by those persons of ordinary skill in the art, the alternatives X, Y and Z shown in FIG. 5 do not exhaust all the possible digital channel combinations which may be defined on any available carrier. In FIG. 5, for example, only one DCC is defined for each of the alternatives X, Y and Z and the other time slots are shown to be fully occupied by DTCs. It will be understood, however, that more than one DCC (full-rate or half-rate) may be defined on the carrier and the status (occupied or vacant) of any remaining time slots depends on whether they are used to define one or more DTCs (full-rate or half-rate) which may be assigned to carry telephone conversations.

In general, the type (full-rate or half-rate) and number of DCCs which are defined on any carrier depends on how much control channel capacity is needed for a particular application. The smallest building block may be considered a half-rate DCC. Hence, one may start by defining a half-rate DCC on an available carrier. If more capacity is needed, a full-rate DCC may be substituted for the half-rate DCC. The next step may be to have one full-rate DCC and one half-rate DCC on the carrier, then two full-rate DCCs followed by the addition of one half-rate DCC, and finally to have three full-rate DCCs on this carrier (at this point, the whole carrier is taken up for control information and there are no more capacity left for digital speech information). If more capacity is still needed, one or more DCCs may be defined on another carrier starting with a half-rate DCC and then proceeding as before.

Figure 1:
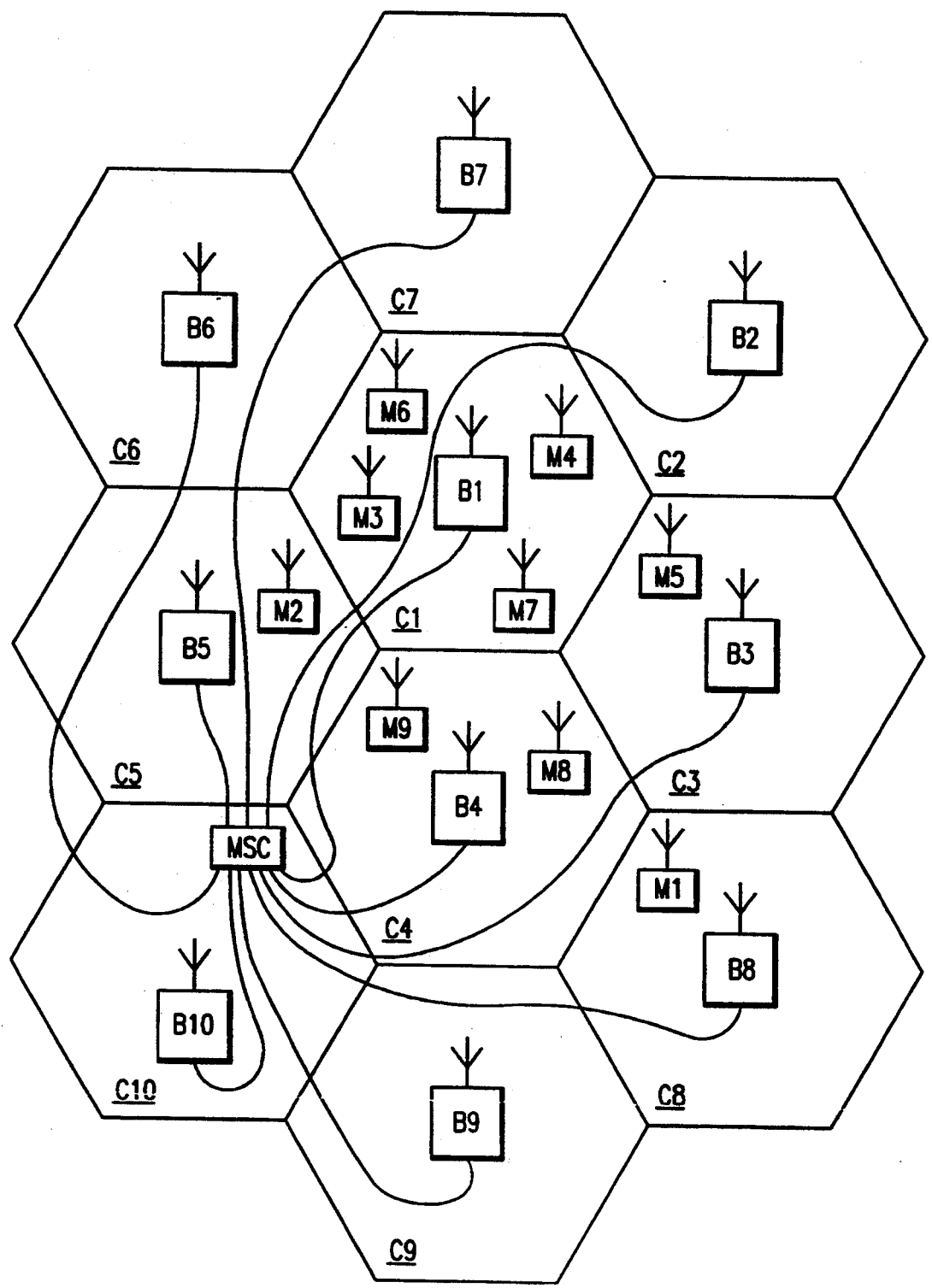
FIG. 1 shows the architecture of a conventional cellular radio system.
Figure 2:
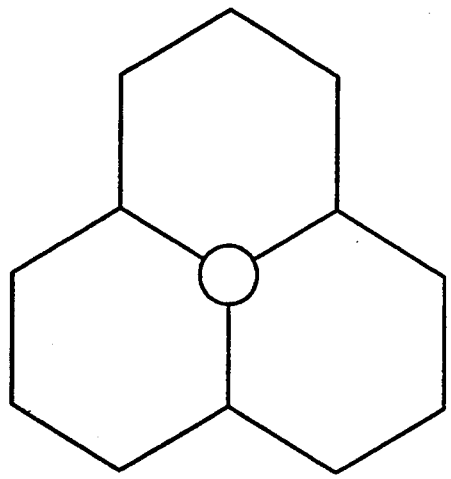
FIG. 2 shows a three sector cell which may be used in the system shown in FIG. 1.
Figure 3:
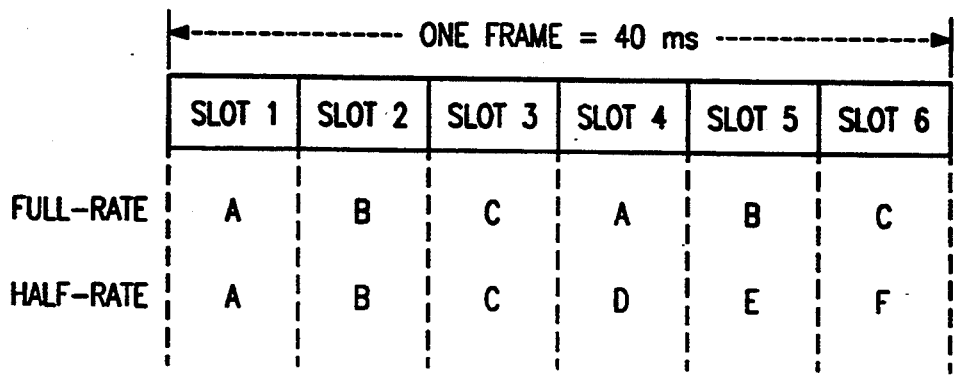
FIG. 3 shows the channel frame structure for a time division multiplexed (TDM) radio frequency (RF) channel according to a known industry standard.
Figure 4:
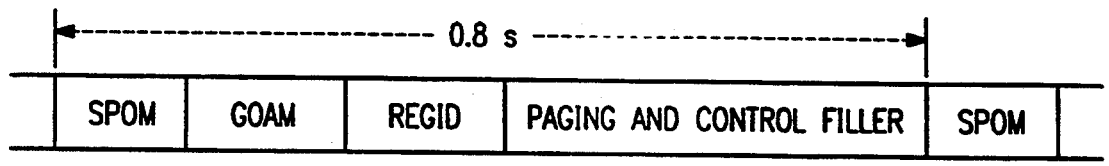
FIG. 4 shows the format of the forward analog control channel (ACC) specified in this industry standard.

Returning to FIG. 5, a plurality of consecutive TDM frames according to IS-54 may be grouped into a "superframe" for purposes of the present invention. In general, there does not have to be any particular relationship between a superframe as used in the present invention and a TDM frame as defined in IS-54. In the embodiment of the present invention described herein, however, a DCC slot is configured (sizewise, etc. ) the same as a DTC slot within an IS-54 TDM frame (voice and control information are interleaved on the same carrier). In IS-54, the TDM "frame" consists of six consecutive slots and is 40 ms long. For full-rate operation, however, each user is assigned two slots of the TDM frame, one slot every 20 ms (for half-rate, each user is assigned only one slot of the frame). If a TDM "block" is defined to consist of three contiguous TDM time slots, the first of which coincides with the first or fourth slot of an IS-54 TDM frame (FIG. 3), the superframe will then consist of an integer number of TDM blocks, each of which is 20 ms long.

Figure 6:
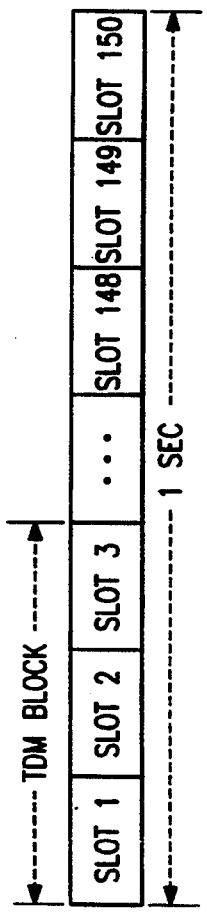
FIG. 6 shows the structure of an exemplary superframe according to the present invention.

Referring next to FIG. 6, the structure of an exemplary superframe may now be seen. In general, a superframe may consist of any suitable number of TDM blocks. In FIG. 6, the superframe consists of 50 TDM blocks (150 slots) and, therefore, the length of this superframe is 1 second (=50×20 ms). If one full-rate DCC is used, e.g., alternatives X or Y in FIG. 5, each such superframe will contain 50 DCC slots, i.e., 50 slots per second on the carrier will be occupied by the DCC. Conversely, if one half-rate DCC is used, e.g., alternative Z in FIG. 5, each such superframe will contain 25 DCC slots. At least some of the DCC slots in each superframe on the forward DCC will be used for paging mobile stations, i.e., to notify an idle mobile station of an incoming call.

According to the present invention, each mobile station is assigned one of the DCC slots in each superframe for receiving paging messages. Hence, a superframe may be defined as the time between one DCC slot which is assigned for paging a certain mobile station and the next DCC slot which is assigned for paging the same mobile station. Since there are likely to be a much greater number of mobile stations than there are DCC slots in each superframe, the slot assigned for paging one mobile station may also be used for paging other mobile stations which share some unique characteristic. On a broader level then, a superframe may be defined to be the time between DCC slots which are assigned to the same paging group.

Any one of a number of parameters may be used to distinguish between different groups of mobile stations for paging purposes. If, for example, the mobile identification number (MIN) is used to differentiate between paging groups, then paging messages to mobile stations having a MIN which ends with the digit "0" may be sent in one DCC slot of each superframe, paging messages to mobile stations having a MIN which ends with the digit "1" may be sent in another DCC slot of each superframe, and so on.

When in idle mode, each mobile station in a particular paging group "wakes up" during one slot of each superframe (locks onto and reads the DCC slot assigned to its paging group), then looks for a paging message addressed to it (determines whether it has received a paging message which includes its MIN) and, if no such message has been received, the mobile station "goes back to sleep" (turns off most internal circuitry to save power). A mobile station which is listening for a paging message on the DCC of the present invention, therefore, is "awake" for only short periods of time and will consume considerably less battery power than a counterpart mobile station which is listening to the prior art analog control channel of IS-54 and continuously reading all control information in search of a paging message addressed to it.

There is a tradeoff, however, between the savings in battery power and the delay in call set-up (the time a caller has to wait before being connected to the mobile subscriber). This tradeoff defines how often each mobile station is required to "wake up" and "look" for a paging message on the DCC or, in other words, how long should each superframe be. For example, if each superframe is one second long (FIG. 6), each mobile station is "awake" for only one slot of the time, a fiftyfold saving in battery usage as compared with a full-rate DTC. In this instance; a call placed to a mobile station will, on average, be delayed for ½ of a second and the maximum possible delay will be 1 second (the actual delay in call set-up will depend on when the call was placed relative to when the next paging group slot for paging the mobile station occurs).

Extending the length of the superframe from 1 second to 2 seconds doubles the power savings but increases the average call set-up delay from ½ second to a full second. Conversely, reducing the length of the superframe from 1 second to ½ second halves the power savings but decreases the average call set-up delay from ½ second to ¼ second. The range of superframes, therefore, encompasses the possibility to either limit the battery drain in the sleep mode by defining a large number of paging groups, i.e., a long superframe, or to limit the terminating call set-up time by defining a small number of paging groups, i.e., a short superframe.

Note that the key to balancing the competing goals of conserving battery consumption and constraining call set-up time is the number of paging groups (paging slots) in each superframe and not the number of mobile stations in each paging group. Once the balance has been struck and the number of paging groups determined, an excessive number of mobile stations in any paging group may present a queuing problem. For example, if the length of the superframe is selected to be one second, and the rate of calls to mobile stations in any paging group is greater than one call per second, then some of these calls will be lost or indefinitely delayed in the que. This problem, however, is one of capacity and may be solved by converting from a half-rate DCC to a full-rate DCC or, if necessary, by activating another half-rate or full-rate DCC on the same or a different carrier in the manner and sequence described earlier.

Figure 7:
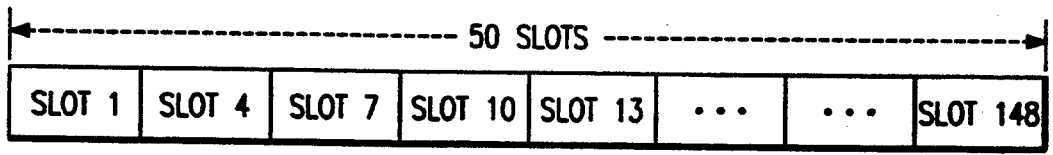
FIG. 7 shows the structure of a full-rate DCC in the superframe shown in FIG. 6.

Referring next to FIG. 7, the structure of a full-rate DCC in the superframe shown in FIG. 6 may now be seen. In FIG. 7, the DCC slots have been extracted from the superframe of FIG. 6 and placed next to each other for illustration purposes. The full-rate DCC occupies slots 1, 4, 7, 10 ... and 148 of the superframe and is configured according to alternative Y in FIG. 5. It should be understood, however, that a full-rate DCC configured according to alternative X in FIG. 5, or a half-rate DCC configured according to alternative Z in FIG. 5, may have been used instead. Several other configurations for either a full-rate or a half-rate DCC on the carrier are also possible as explained in connection with FIG. 5.

With continuing reference to FIG. 7, many of the DCC slots in each superframe will be used for paging, i.e., assigned to different paging groups. Not all of the DCC slots in each superframe, however, will be paging slots. At least some DCC slots may be used for transmitting overhead information to all mobile stations while other slots may be used for transmitting data packets to specific mobile stations. For example, the first five DCC slots (slots 1, 4, 7, 10 & 13 in FIG. 7) may be used to broadcast overhead information, the next forty DCC slots may be used for paging, and the last five DCC slots of the superframe may be used for packet data. The overhead, paging, and data messages are but one example of the different kinds of information which may be sent on the DCC.

The overhead information which is sent in one or more slots of the DCC comprises information about the serving system and the desired behavior of the mobile station when operating in this system. The overhead information may include, for example, an indication of (i) the paging slot to which a mobile station is assigned, (ii) whether the mobile station is allowed to make and receive any calls through this base station or only emergency calls (restricted calls), (iii) the power level to be used for transmitting to this base station, (iv) the identity of the system (home system or visited system), (v) whether to use an equalizer or not (an equalizer is used at the receiver to compensate for the distortion and attenuation effects of the radio channel on the transmitted signal), or (vi) the location of DCCs (frequency, time slot, time offset of superframe) of neighboring base stations of which one may be selected if the DCC signal received from this base station is too weak or for some other reason, e.g., the signal form another base station is stronger than the signal from this base station.

According to the present invention, when a mobile station locks onto the DCC, the mobile station will first read the overhead information to determine the system identity, call restrictions, etc., and the location of (i) the DCCs at neighboring base stations (the frequencies, time slots, etc., on which these DCCs may be found) and (i i) the paging slot in the superframe (the DCC slot assigned to the paging group to which the mobile station belongs). The relevant DCC frequencies are stored in memory and the mobile station then enters sleep mode. Once every superframe, e.g., once every second, the mobile station "wakes up" to read the assigned paging slot and then returns to sleep.

During sleep mode, the mobile station is largely inactive but yet has certain tasks to perform. The mobile station, for example, will monitor the signal strength of the relevant DCC frequencies which were earlier stored in memory. To this end, the mobile station may periodically scan through these frequencies and measure the signal power level at each then-tuned-to frequency. Note that the process of measuring the signal strength at any frequency is indifferent as to whether voice or data is being transmitted on that frequency at the time of measurement since the transmit power is the same in all time slots of the frequency.

According to the present invention, if the current DCC signal strength falls below a predetermined level, the mobile station can immediately tune to the best (strongest) of the monitored DCC frequencies or to a DCC which is stronger than the current DCC by a predetermined amount. This is to be distinguished from present-day operation on the analog control channel (ACC) in which a mobile station which "loses" the current control channel has to rescan all of the dedicated control channels in the system (21 channels in the United States) to find the strongest control channel.

Another difference between operation on the DCC of the present invention and operation on the ACC of IS-54 is the reading of overhead messages. According to IS-54, the mobile station continuously reads all overhead messages transmitted in the overhead message train (OMT) on the ACC. According to the present invention, however, the mobile station reads overhead information once when locking on to a DCC and then from time to time but only when the overhead information has changed. This minimizes the amount of overhead information which must be read by a mobile station which, in turn, minimizes the battery drain in the mobile station.

Figure 8:
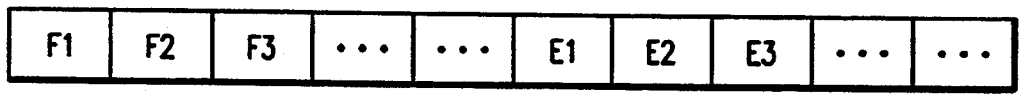
FIG. 8 shows an exemplary format for the overhead information on the DCC of the present invention.

Referring next to FIG. 8, an exemplary format for the overhead information on the DCC may now be seen. The overhead information is divided into different categories of "information elements" E1, E2, E3, etc., to which a plurality of associated "change flags" F1, F2, F3, etc, are appended. The information elements comprise different types of overhead messages which may be sent on the DCC. Each change flag represents a pointer to a corresponding information element, i.e., change flag Fi represents a pointer to information element Ei, where "i" is 1, 2, 3, etc.

Instead of continuously reading the information elements themselves, a mobile station reads at regular intervals the pointers to (the change flags associated with) the information elements. The change flags are transmitted along with the corresponding information elements and the mobile station can then determine from the change flags whether or not to read the information elements. A particular change flag Fi will be set when the value of the corresponding information element Ei has changed. When, and only when, Fi is set, must the mobile station read Ei during sleep mode (if Fi is one bit, for example, Fi may be set to "1" when Ei changes and reset to "0" at all other times). When locking onto a new DCC, the mobile station may be required to read all information elements regardless of the then-current status of the change flags.

Note that the information elements (overhead information) shown in FIG. 8 are repeated at regular intervals to provide the mobile stations, especially those about to lock onto the DCC, with the information required for system access, etc. The actual repetition frequency may be determined by considering how quickly mobile stations need to receive the information in the face of radio channel disturbances (in the prior art analog control channel, for example, the SPOM is transmitted every 0.8 seconds). As well known in the art, certain radio phenomena, e.g., Rayleigh fading, cochannel interference, etc., in the mobile environment may lead to the incorrect decoding of a transmitted message (bit errors). If each type of message is transmitted at a rate higher than the rate at which the contents of the message change, the receiver will have multiple opportunities to correctly decode the contents of each transmitted message (there is a distinction between how often a message is sent and how often the contents of the message change).

In the context of transmissions according to the principle shown in FIG. 8, the Fi (s) and Ei (s) will be repeated with a minimum periodicity, e.g., once every superframe or once every second if each superframe is one second long. Because of the hostile mobile environment, however, a mobile station may not be able to properly decode the Fi or Ei contained in a particular superframe. If the value of Fi in this superframe was set (Ei has changed), the mobile station will have missed a change in the value of Ei (the Fi in the next superframe (s) will be reset and the mobile station will not attempt to read Ei again until Ei changes again and Fi is set).

To ensure that as many mobile stations as possible are informed of each change in an Ei, the system may keep the value of Fi set for a number of superframes following each superframe in which the value of Ei changes. In this manner, if the mobile station fails to read Ei when it changes, it still has at least one more chance to read the new value of Ei. While this technique ameliorates the threat of missing a new Ei value due to failed decoding, it may cause the mobile station to repeatedly read the new value of Ei leading to an unnecessary waste of battery power during sleep mode operation. By proper configuration of the change flags, however, this undesirable effect can be avoided.

According to the present invention, each change flag Fi may consist of two bits. The value "00" for Fi may be used, for example, to indicate to the mobile station that information element Ei has not changed and there is no need to read Ei. Conversely, the value "01" for Fi may be used to indicate to the mobile station that information element Ei has changed and needs to be read. The value "11" for Fi, on the other hand, may be used to indicate a conditional read, i.e., the mobile station should read Ei only if the mobile station missed (could not properly decode) the Fi in the previous superframe. The change flag Fi is set to "11" in a predetermined number of superframes following a superframe in which this Fi was set to "01". The following table illustrates the action to be taken by the mobile station based on the value of Fi in the previous and current superframes (an "X" in either Fi column means that Fi was missed):

| Previous Fi | Current Fi | Read Current Ei |
| --- | --- | --- |
| 00 | 00 | No |
| 01 | 00 | No |
| 11 | 00 | No |
| X | 00 | No |
| 00 | 01 | Yes |
| 01 | 01 | Yes |
| 11 | 01 | Yes |
| X | 01 | Yes |
| 00 | 11 | System Error |
| 01 | 11 | No |
| 11 | 11 | No |
| X | 11 | Yes |
| X | X | X |

As illustrated in the table above, regardless of the value of the previous Fi, the mobile station never reads the current Ei if the value of the current Fi is "00" and always reads the current Ei if the value of current Fi is "01." This is analogous to having a one-bit change flag which is reset to "0" to indicate a "no read" and set to "1" to indicate a "read" where each Ei and Fi are transmitted only once. Where the value of Ei in a superframe has changed, the value of Fi in at least one subsequent superframe will be "11" and the mobile station will not read Ei again. If the mobile station misses reading the value of the previous Fi and the value of the current Fi is "11," the mobile station will read the current Ei in order to account for the possibility that the value of the missed Fi was "01."

In general, the management of the change flags may be controlled by the system operator subject to one condition. If the value of the previous Fi is "00," the value of the current Fi should not be "11." This sequence presents an inherent contradiction since "00" for the previous Fi indicates that the previous Ei has not changed while "11" for the current Fi indicates that the previous Ei did change (hence the designation "system error"). Apart from this anomaly, the operator retains substantial flexibility. In the table above, for example, the value "01" for the previous Fi is shown to be followed by any of the values "00," "01" or "11" for the current Fi. In general, it is preferable that a conditional read always follow a read, i.e., the Fi value "11" always follows the Fi value "01," in order to minimize battery drain. If, however, the current Fi value is "00" or "01" and the previous Fi value is "01" (and "01" represents a new change of Ei), this would only mean that the mobile station only has one chance to properly decode the change in Ei value indicated by the previous Fi.

In practice, it may not be feasible or even technically possible for the mobile station to read only one information element Ei or one change flag Fi separately form other Ei (s) or Fi (s) since it is more practical to group a plurality of information elements or a plurality of change flags together for purposes of channel coding, including error detection (CRC) coding. Thus, in practice, a set of information elements or change flags may be the minimum readable unit.

Giving due consideration to the compatibility and complexity issues referred to earlier in connection with the slot format on the DCC, the minimum portion of time for a mobile station to be active (reading) should preferably be equal to the duration of one DTC slot. The change flags, therefore, may be transmitted in the first DCC slot (referred to hereinafter as the FBCCH) at the beginning of each superframe and the information elements may be transmitted in the remaining portions of that first slot and in a given number of subsequent DCC slots (referred to hereinafter as the SBCCH and EBCCH) in the superframe.

The first DCC slot (FBCCH), which contains the change flags, may be read by the mobile stations often enough to allow the system operator to dynamically adjust the configuration of the system, e.g., access control parameters for mobile stations about to lock onto the DCC, by changing the information carried in the other DCC slots (SBCCH). For mobiles already locked to the DCC, the FBCCH controls whether the other slots (SBCCH and EBCCH) should be read.

The use of change flags to minimize the amount of overhead information which has to be read by a mobile station, without more, achieves the desired objective of limiting battery drain. The present invention, in addition, provides a technique for maximizing the efficient use of the DCC by transmitting different categories of overhead information at different rates. In principle, all categories of overhead information may be sent at the same rate without undermining in the least the objective of limiting battery drain since, even if all overhead information is sent at the same rate, the mobile station only reads the change flags and not the detailed information elements (unless they have changed).

In general, the rate of transmission of overhead information should be sufficient to keep the mobile stations updated with the latest overhead information, especially for those mobile stations about to lock on to the DCC. This could be accomplished by transmitting all overhead information at the rate at which the most frequently updated overhead information should be sent. There is no requirement, however, for sending all overhead information at this high rate. In fact, to do so would waste DCC capacity since some categories of overhead information change less often than other more dynamic categories and, therefore, can be sent at a slower rate without rendering any of the overhead information "stale." For efficient capacity utilization, then, the categories of overhead information which are frequently updated should be transmitted relatively often so that the mobile station is continuously updated, but other categories which are more stable should be transmitted less often.

Figure 9:
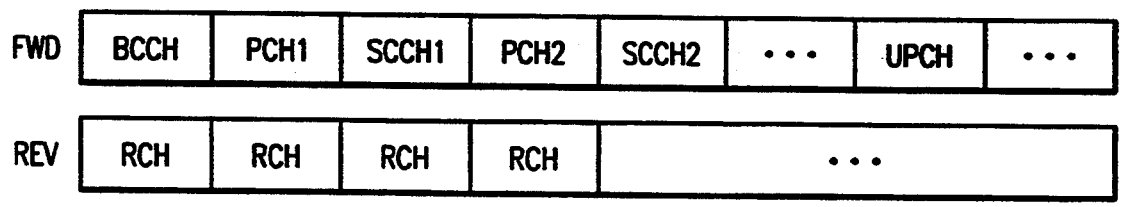
FIG. 9 shows an exemplary logical channel structure for the DCC within a superframe.

Referring next to FIG. 9, an exemplary logical channel structure for the DCC within a superframe may now be seen. In FIG. 9, the DCC slots shown in the superframe of FIG. 7 have been allocated to a set of logical channels. On the forward DCC, this set includes a broadcast control channel (BCCH), at least one paging channel (PCH), a single cell control channel (SCCH) and at least one user packet channel (UPCH). Every time slot on the reverse DCC, however, may be a random access channel (RCH).

Each logical channel transports information streams which have certain common characteristics or which are of a similar type. A logical channel may be characterized according to its distribution path (point-to-point or point-to-multipoint) and direction of transmission (unidirectional or bidirectional). The BCCH is a unidirectional, point-to-multipoint channel which carries overhead information enabling the mobile stations, for example, to identify the system and the control and paging channels. The types of overhead information carried on the BCCH of the DCC correspond, to some extent, to the types of overhead messages sent in the OMT on the analog control channel (ACC), e.g., SPOM, GOAM and REGID.

In general, each superframe will contain several paging channels which are assigned to different paging groups. Each PCH is a unidirectional channel which carries paging messages specifically directed to an individual mobile station or a group of mobile stations, e.g., a fleet of trucks. Each SCCH (there may be several) is a bidirectional, point-to-point which is used for controlling individual mobile stations in a single cell. The UPCH is not a control channel in the strict sense of the term but is actually a traffic channel which may be used for transmission of packetized (asynchronous) data to individual users. Finally, the RCH is a unidirectional, point-to-point channel which is used for transmitting call originations, page responses and registration messages from an individual mobile station. Replies to the mobile station may be returned via the SCCH.

The logical channel structure (the particular set of logical channels) and the locations of the logical channels within the superframe shown in FIG. 9 are exemplary only and are not intended to encompass the vast range of possible sets of logical channels and corresponding channel locations within the superframe. The "least common denominator" between the various possible sets of logical channels on the forward DCC may perhaps be the BCCH and PCH(s). The twin goals of limiting battery drain and efficiently using the capacity of the DCC are met if, as described before, each PCH occupies a particular slot in each superframe which is assigned to a particular paging group. A structure for the BCCH which advances these goals is shown in FIG. 10.

Figure 10:
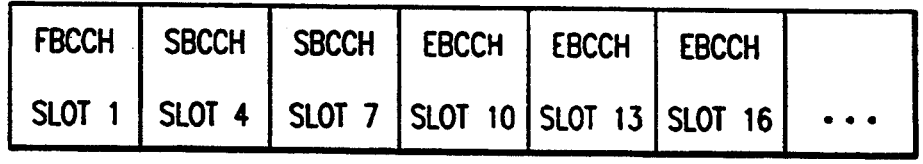
FIG. 10 shows the structure of the BCCH shown in FIG. 9.

Referring next to FIG. 10, the structure of the BCCH shown in FIG. 9 may now be seen. In designing the structure of the BCCH, three major considerations must be taken into account: (i) efficiency, (ii) speed of system access and (iii) portable battery economy. Careful examination of the classes of messages which need to be sent on the BCCH leads to a design in which different classes of BCCH are defined. These BCCH classes may be defined with reference to the rate at which the information they carry needs to be read by a mobile station.

Several different kinds of information may be carried on the BCCH. For example, the BCCH may carry the following categories of information: (i) random access control parameters and authentication parameters (authentication is the process by which the system verifies the validity of the mobile station or vice versa), (ii) messages of general interest to the end user (for example, information about a traffic accident in the vicinity of the mobile subscriber), (iii) the presence, location (frequency, time slot, etc.) and certain characteristics of the DCCs of neighboring cells, and (iv) serving system and cell identification and their service capabilities.

The rate at which the information contents change is the highest for category "(i)" messages and the lowest for category "(iv)" messages. In other words, the rate of change generally decreases in ascending order from category "(i)" to category "(iv)." Moreover, the length of messages may vary between categories. For example, category "(ii)" messages may be quite long (several words as defined in IS-54) but they are sent sporadically. Hence, not only will the information elements in the different categories change at different rates, but also the amount of information to be transmitted over the BCCH could vary over time in an unpredictable fashion. Provision must then be made in the BCCH for different types of messages whose contents vary at different rates and which are of different lengths.

On the forward DCC, there is the BCCH, the PCHs and possibly other types of logical channels as shown in FIG. 9. A superframe on the forward DCC may be defined as the repetition time from one BCCH to the next BCCH or from one PCH to the next PCH assigned to the same paging group. Each PCH will generally carry only one type of messages, i.e., paging messages, and is preferably assigned only one slot in each superframe to minimize battery drain. The BCCH, on the other hand, may carry different types of messages of different lengths and may be assigned either a fixed number of slots in each superframe or a dynamic number of slots which changes from one superframe to another depending on instantaneous capacity needs, i.e., the number and length of BCCH messages to be transmitted at any time.

At least two considerations support the allocation of a fixed rather than a dynamic number of slots to the BCCH in each superframe. First, changing the number of BCCH slots from one superframe to another complicates the operation of the mobile station when reading the BCCH slots (the mobile station would be required to constantly determine which slots in each superframe are allocated to the BCCH). Second, a dynamic allocation of BCCH slots would result in a waist of PCH capacity since either a large number of slots would have to be reserved for BCCH in every superframe to deal with the worst case scenario (the longest possible BCCH message) leaving less slots for the PCHs in the superframe or, alternatively, a small number of slots is reserved in each superframe in which case the adjoining PCH slots would have to be discarded whenever a long BCCH message needs to be transmitted.

To avoid wasting PCH capacity if dynamic BCCH slot allocation is chosen, a small number of slots could be reserved for the BCCH and the mobile stations assigned to adjoining PCH slots could be reassigned to other PCH slots in the superframe whenever a long BCCH message has to be transmitted. Changing the number of PCH slots (paging groups)in the superframe, however, would require the affected mobile stations to be awakened for reassignment during sleep mode which contradicts the goal of limiting battery drain. Hence, dynamic BCCH slot allocation would have to be designed for the worst case situation in which event the BCCH slots would most often (at all times other than when a long message has to be transmitted) be filled with wasteful control filler rather than useful control information.

In sum, allocation of a fixed number of slots for the BCCH in each superframe is preferred over a dynamic allocation. The actual number of BCCH slots in each superframe may be selected by the cellular operator to meet the needs of the application (the selected number of BCCH slots will be conveyed to the mobile station over the DCC). Regardless of how many slots per superframe are us ed for the BCCH, however, the mobile station should be required to read as little BCCH information (slots) as possible during sleep mode to minimize battery drain. For this purpose, the BCCH may be organized into a plurality of information elements and their associated change flags as shown in FIG. 8.

The change flags may be inserted in a portion of the BCCH which i s read by a mobile station with some minimum frequency, e.g. , once every superframe or once every second. Because this portion is frequently read by the mobile station, it should be as small as possible for efficient sleep mode operation. In general, this portion may be any unit of time which is less than or equal to a slot in length. To simplify the reading by the mobile station, however, this portion may be made equal to one BCCH slot, called the "fast" BCCH (FBCCH), which is repeated once in every superframe. The information elements may be inserted in any part of the FBCCH not occupied by the change flags and in subsequent BCCH slots. These subsequent slots may be contiguous to, or remote from, the FBCCH and may be organized into one or more logical channels.

Considering the spectrum of different categories of information, the FBCCH which is read often may be used to transmit information which is frequently updated. To avoid repetitive reading of information which is not frequently updated, this information may be transmitted in other BCCH channels. The mobile station may obtain from the FBCCH both the change flags and information about the location of these other BCCH channels in the superframe (how many slots are assigned to them, their starting positions, etc.). The FBCCH, therefore, may indicate not only when, but also where to read the information elements.

Some information will have to be transmitted in every superframe to allow a mobile station to read other information in the superframe, or to quickly find the best serving cell, when first locking onto a DCC. For example, certain basic information about the low-layer structure of the DCC will have to be read by a mobile station before any other information in the superframe can be read. This basic information may include, for example, the superframe start indicator, the superframe period (number of DCC slots), whether the DCC is half-rate or full-rate, the DCC format (which slot 1, 2 or 3 in a TDM block), the location of other BCCH channels, the location of the assigned PCH, and whether the mobile station receiver should use an equalizer. Other types of information should also be sent rather often so that a mobile station can quickly accept or reject a particular DCC. For example, information about the availability and data capability of a cell (the cell may be available only to a closed user group or may not be capable of handling data transmissions from a mobile station), the identity of the system and the cell, etc., may need to be sent in every superframe.

In general, at least some of the information required for system access may be sent in the FBCCH which is read in every superframe (assuming there is enough space left in FBCCH after inserting the change flags). This allows mobile stations which are locking onto a DCC to quickly find the information needed, for example, to receive or place a call. Having locked onto a DCC, however, the mobile station will need not to read this information again unless it changes. For efficient sleep mode operation, therefore, most if not all such information may be sent not in the FBCCH but in another subchannel of the BCCH called the "slow" BCCH (SBCCH). Like the FBCCH, the SBCCH is repeated with a minimum periodicity, e.g. , every superframe, and is assigned a fixed number of slots in each superframe (the number and location of slots in the SBCCH may be indicated in the FBCCH). Unlike the FBCCH, however, the SBCCH is not read every time it is sent but read only when the associated change flags in the FBCCH are set (except that the SBCCH may be read once prior to system access).

When locking onto a DCC, the mobile station may automatically read the SBCCH. If each superframe is one second long, the mobile station, on average, will have to wait half a second to read the information in the SBCCH. In the radio environment, however, where cochannel interference and Rayleigh fading may cause bit errors in the first few received superframes, or where the mobile station is unable to synchronize immediately to the first received superframe but synchronizes to a subsequent frame, the true average waiting time to read (decode) the SBCCH may actually be longer than half a second. Having locked onto the DCC and read the information elements in the SBCCH once, however, the mobile station will not read any of them again until required to do so by the corresponding change flags in the FBCCH.

The FBCCH and SBCCH discussed thus far use a relatively small number of slots per superframe and serve to accommodate the desire for efficient sleep mode operation and fast cell selection (the number of slots in each of the FBCCH and SBCCH is fixed but system controlled). A mechanism is still needed to send long overhead messages over the BCCH. For this purpose, a third BCCH channel, called the "extended" BCCH (EBCCH), is introduced.

The EBCCH is also assigned a system controlled fixed number of slots per superframe but a long message sent on the EBCCH may extend (span) over several superframes and, hence, the number EBCCH slots in each superframe can be much less than the number of slots needed to carry the long message. In other words, the number of EBCCH slots in each superframe is fixed regardless of message length. If there are not enough EBCCH slots in a superframe to accommodate all EBCCH messages, subsequent superframes are used. Mobile stations may be notified through the FBCCH or SBCCH of the number and location of EBCCH slots assigned per superframe. A start of EBCCH marker may be sent in the current FBCCH or SBCCH to inform the mobile stations that the current superframe contains the start of an EBCCH message.

With the EBCCH, long and/or sporadic information may be sent on the DCC without jeopardizing the organization of the superframe, e.g. , PCH assignments, or the DCC capacity. For example, the list of DCCs of neighboring base stations may be sent on the EBCCH. The information contained in this list is rather large and requires several slots which, instead of taking up a large portion of one superframe, may be spread out over the EBCCH of several superframes.

According to the present invention, therefore, the BCCH is partitioned into three logical subchannels, namely, the FBCCH, SBCCH and EBCCH, at least two of which (SBCCH and EBCCH) may be used to transmit different categories of information. In general, the SBCCH carries messages of predictable or predefined length. The EBCCH provides the added flexibility for sending variable length messages. The FBCCH, SBCCH and EBCCH may be consecutive blocks in a superframe.

The FBCCH contains change flags which inform the mobile station whether to read the information elements in the SBCCH and the EBCCH. Alternatively, the FBCCH may contain change flags for the information elements in the SBCCH and the SBCCH may contain change flags for the information elements in the EBCCH. The mobile station reads the FBCCH with a minimum periodicity. The SBCCH may be read at least once before making access to the system. The EBCCH may also be read at least once. When locking onto a DCC, the mobile station may read all of the information in the FBCCH, SBCCH and EBCCH. Once locked to the DCC, the mobile station reads only the FBCCH and the as signed PCH in every frame during sleep mode unless the change flags indicate that the mobile station should also read the information elements in the SBCCH and/or the EBCCH.

It should be pointed out, that the location of the change flags may be varied in different applications. For example, the change flags for the SBCCH (and possibly also the EBCCH) may be placed in the assigned PCH, in which case the mobile station may read only the assigned PCH during sleep mode operation instead of reading both the FBCCH and the assigned PCH (the change flags for the EBCCH may be placed in the assigned PCH or in the SBCCH). In fact, the FBCCH may be eliminated altogether or, if the FBCCH is retained, the PCH may contain change flags for the information elements in the FBCCH in addition to the SBCCH (and possibly also the EBCCH). In yet another variation, copies of the flags for the SBCCH (and possibly also the EBCCH) may be placed in both the FBCCH and assigned PCH. The latter approach may have merit for mobile stations not currently assigned to a PCH, e.g., a mobile station operating on the UPCH.

It should be further pointed out that, because of the way in which messages may be formatted over the DCC, a mobile station may not be able to read any one information element (Ei) independently of all other information elements but may have to read, at a minimum, a set of information elements which have been grouped and coded together and then inserted into one of the slots of the FBCCH, SBCCH or EBCCH. In this case, each of the changes flags will point not to an individual information element but instead to a set of information elements which may occupy a part or the whole of one FBCCH, SBCCH or EBCCH slot, or even the entire FBCCH, SBCCH and/or EBCCH channel, e.g., all the BCCH. Depending on message formatting, therefore, a change flag may signal whether or not the mobile station should read a single information element, a set of information elements, an entire slot or the whole FBCCH, SBCCH and/or EBCCH, as applicable.

In the embodiment (s) of the present invention discussed in detail herein, certain slot, frame, superframe and channel formats are used. However, the teachings of the present invention are equally applicable to other formats which may be used by persons of ordinary skill. In addition, the cellular radio system of the embodiment described herein utilizes time division multiplexing (TDM) techniques. It should be clearly understood, however, that the teachings of the present invention, e.g., the pointer technique (change flags) and the partitioning of the overhead information (BCCH), apply with equal force to any wireless communication system including, without limitation, a cellular radio system which uses frequency division multiplexing (FDM) or code division multiplexing (CDM) techniques.

The foregoing detailed description, therefore, shows only certain particular embodiments of the present invention. However, those skilled in the art will recognize that many modifications and variations may be made without departing substantially from the spirit and scope of the present invention as discussed and illustrated herein. Accordingly, it should be clearly understood that the form of the invention described herein is exemplary only and is not intended to limit, in any way, the scope of the invention as defined in the following claims.

What is claimed is:

1. A method for transmitting at a transmitter and receiving at a receiver information which changes from time to time and which is transmitted at regular intervals comprising the steps of:

transmitting along with each transmission of said information from said transmitter an indication of whether said information has changed, said indication being set to any one of first, second and third values, said first value indicating that said information has not changed and should not be read, said second value indicating that said information has changed and should be read, and said third value being transmitted a predetermined number of times after said second value is transmitted to indicate that said information should be read only if it has not been read since said second value was transmitted; and reading said information at said receiver as indicated by said values.

2. The method of claim 1 wherein said transmitter comprises a base station, said receiver comprises a mobile station and said information comprises overhead information.

3. The method of claim 2 wherein said base station transmits said overhead information to said mobile station over a digital control channel.

4. A method for communicating information over a digital control channel (DCC) divided into a plurality of channels including a broadcast control channel (BCCH) and a paging channel (PCH) comprising the steps of:

dividing said BCCH into a plurality of subchannels for transmitting different portions of said information;

transmitting at least one portion of said information in at least one of said BCCH subchannels;

transmitting at least one change flag in at least one of said PCH and said BCCH subchannels to indicate when said at least one information portion changes;

receiving said at least one change flag; and reading said at least one information portion in response to an indication in said at least one change flag.

5. The method of claim 4 wherein said BCCH subchannels comprise:

a fast broadcast control channel (FBCCH);

a slow broadcast control channel (SBCCH); and an extended broadcast control channel (EBCCH).

6. The method of claim 5 wherein:
a first information portion is transmitted in said SBCCH;
a second information portion is transmitted in said EBCCH; and
first and second change flags are transmitted in said FBCCH to indicate when said first and second information portions, respectively, change.

7. The method of claim 5 wherein:
a first information portion is transmitted in said SBCCH;
a second information portion is transmitted in said EBCCH;
a first change flag is transmitted in said FBCCH to indicate when said first information portion changes; and
a second change flag is transmitted in said SBCCH to indicate when said second information portion changes.

8. The method of claim 5 wherein said information is communicated over said DCC in a series of superframes, each including a plurality of time slots, and wherein:
said FBCCH occupies one time slot in each said superframe;
said SBCCH occupies a first predetermined number of time slots in each said superframe; and
said EBCCH occupies a second predetermined number of time slots in each said superframe.

9. The method of claim 8 wherein said at least one information portion comprises at least one data message which is transmitted in the EBCCH over a plurality of consecutive superframes.

10. The method of claim 8 wherein said PCH occupies one time slot in each superframe.

11. The method of claim 5 wherein:
a first information portion is transmitted in said SBCCH;
a second information portion is transmitted in said EBCCH; and
first and second change flags are transmitted in said PCH to indicate when said first and second information portions, respectively, change.

12. The method of claim 5 wherein:
a first information portion is transmitted in said SBCCH;
a second information portion is transmitted in said EBCCH;
a first change flag is transmitted in said PCH to indicate when said first information portion changes; and
a second change flag is transmitted in said SBCCH to indicate when said second information portion changes.

13. The method of claim 5 wherein:
a first information portion is transmitted in said SBCCH;
a second information portion is transmitted in said EBCCH; and
first and second change flags are transmitted in each of said FBCCH and said PCH to indicate when said first and second information portions, respectively, change.

14. The method of claim 4 wherein said BCCH subchannels comprise:
a fast broadcast control channel (FBCCH); and
an extended broadcast control channel (EBCCH).

15. The method of claim 4 wherein said BCCH subchannels comprise:
a slow broadcast control channel (SBCCH); and
an extended broadcast control channel (EBCCH).

16. A method for receiving at a mobile station overhead information comprised of a plurality of overhead information elements transmitted during predetermined time intervals, each of said information elements being associated with a change of value indication also transmitted to said mobile station, comprising the steps of:
reading the overhead information elements contained in at least the first interval;
reading an element of the overhead information contained in at least one interval subsequent to said at least first interval in response to the receipt of an indication that the value of said overhead information element has changed; and
placing said mobile station in a sleep mode during at least a portion of the time when said mobile station is not reading said overhead information elements.

17. The method of claim 16 wherein said overhead information is transmitted in at least one of a plurality of repetitive time slots.

18. The method of claim 17 wherein paging information is transmitted to said mobile station in at least one other repetitive time slot and said mobile station is placed in said sleep mode during at least some of the time slots when it is not reading either said overhead or said paging information.

19. The method of claim 16 wherein said overhead information includes an indication of the transmit power level to be used by said mobile station.

20. The method of claim 16 wherein said overhead information includes an identification of the system which is transmitting said overhead information to said mobile station.

21. The method of claim 16 wherein said overhead information is received over a digital control channel (DCC) and said overhead information includes an identification of at least one other DCC capable of being received by said mobile station.

22. The method of claim 21 further comprising the step of monitoring during said sleep mode the signal strength of said at least one other DCC.

23. The method of claim 16 wherein said overhead information element and said change indication are repeated in a plurality of time intervals.

24. The method of claim 23 wherein said change indication is set to a first value in the time interval in which the value of said overhead information element changed, and set to a second value in at least one succeeding time interval in which said overhead information element and said change indication are repeated, said second value indicating that said mobile station should read said overhead information element only if it failed to correctly receive the changed value of said information element in a preceding time interval.

25. The method of claim 16 wherein said overhead information element comprises a message transmitted to said mobile station from a base station in a cellular radio communications system.

26. In a radio communications system operating on a digital control channel (DCC) which is divided into a plurality of time slots, said time slots being grouped into a series of superframes, a method for transmitting a plurality of information elements having changeable values over said DCC comprising the steps of:

dividing said information elements into a plurality of groups each including at least one information element;

assigning to each of said groups a change flag indicating whether the value of any of its constituent information elements has changed; and transmitting said groups and said assigned change flags in at least one of said time slots in said superframes.

27. The method of claim 26 wherein said assigned change flags are transmitted in the first slot of said superframes and said groups of information elements are transmitted in at least one of the other slots of said superframes.

28. The method of claim 26 wherein a mobile station receives said assigned change flags and reads a group of information elements if its assigned change flag indicates a change in the value of any of its constituent information elements.

29. A method of transmitting a plurality of messages over a digital control channel (DCC) comprising the steps of:

dividing the DCC into a plurality of channels including a broadcast control channel (BCCH) and a paging channel (PCH);

grouping the messages into the first and second categories, said first category comprising messages to be transmitted at a first rate over the BCCH and said second category comprising messages to be transmitted at a second rate over the BCCH; and dividing the BCCH into first and second subchannels, said first subchannel being used for transmitting messages in said first category at said first rate and said second subchannel being used for transmitting messages in said second category at said second rate.

30. The method of claim 26 wherein information for enabling reception of said second subchannel is transmitted in said first subchannel.

31. The method of claim 26 wherein said BCCH comprises a plurality of time slots repeated in a series of superframes and said first and second subchannels comprise different time slots in each superframe.

32. The method of claim 26 wherein at least one change flag is transmitted in said first subchannel to indicate whether the contents of at least one of the messages transmitted in said second subchannel have changed.

33. The method of claim 32 wherein said BCCH is received by a mobile station which reads the messages transmitted in said second subchannel if said at least one change flag indicates a change.

34. The method of claim 33 wherein at least some of the information required for system access by said mobile station is included in messages transmitted in said first subchannel.

35. The method of claim 32 wherein said first subchannel comprises a fast BCCH (FBCCH) and said second subchannel comprises a slow BCCH (SBCCH).

36. The method of claim 32 wherein said first subchannel comprises a fast BCCH (FBCCH) and said second subchannel comprises an extended BCCH (EBCCH).

37. The method of claim 32 wherein said first subchannel comprises a slow BCCH (SBCCH) and said second subchannel comprises an extended BCCH (EBCCH).

38. The method of claim 32 wherein said first subchannel comprises a fast BCCH (FBCCH) and a slow BCCH (SBCCH) and said second subchannel comprises an extended BCCH (EBCCH).

39. The method of claim 32 wherein said first subchannel comprises a fast BCCH (FBCCH) and said second subchannel comprises a slow BCCH (SBCCH) and an extended BCCH (EBCCH).

40. In a radio communications system using a digital control channel (DCC) comprised of a broadcast control channel (BCCH) for transmitting broadcast information and a paging channel (PCH) for transmitting paging information, a method for transmitting the broadcast information over the BCCH comprising the steps of:

dividing the BCCH into a plurality of subchannels for transmitting a plurality of different types of broadcast information; and transmitting in the PCH at least one flag which indicates whether there is a change in at least a portion of the broadcast information transmitted in one of the BCCH subchannels.

41. The method of claim 40 wherein said subchannels include an extended BCCH (EBCCH) and said at least one flag in the PCH comprises a flag which indicates whether there is a change in at least a portion of the broadcast information transmitted in said EBCCH.

42. The method of claim 41 wherein:

the broadcast information transmitted in said EBCCH comprises a plurality of messages;

said EBCCH occupies at least one repetitive time slot in a train of superframes; and at least one of said messages is transmitted in said EBCCH over a plurality of consecutive superframes.

43. The method of claim 42 wherein:

said subchannels further include a fast BCCH (FBCCH) and a slow BCCH (SBCCH), each of which occupies at least one other time slot in each superframe; and information for determining the location of said EBCCH in each superframe is transmitted in said FBCCH or said SBCCH, 44. The method of claim 41 wherein said subchannels further include a fast BCCH (FBCCH) and said at least one flag in the PCH further comprises a flag which indicates whether there is a change in at least a portion of the broadcast information transmitted in said FBCCH.

45. The method of claim 41 wherein said subchannels further include a slow BCCH (SBCCH) and said at least one flag in the PCH further comprises a flag which indicates whether there is a change in at least a portion of the broadcast information transmitted in said SBCCH.

46. The method of claim 40 wherein said BCCH comprises first and second subchannels and said at least one flag in the PCH comprises first and second flags, said first flag indicating whether there is a change in at least a portion of the broadcast information transmitted in said first subchannel and said second flag indicating whether there is a change in at least a portion of the broadcast information transmitted in said second subchannel.

47. The method of claim 46 wherein said second flag is also transmitted in said first subchannel.

48. A method for transmitting changeable information in a broadcast control channel (BCCH) comprising the steps of:
- dividing the BCCH into a plurality of subchannels including first and second subchannels;
- transmitting a first portion of the information in said first subchannel and a second portion of the information in said second subchannel; and
- transmitting in said first subchannel an indication of whether said second portion of information has changed.

49. The method of claim 48 wherein said first subchannel comprises a fast BCCH (FBCCH).

50. The method of claim 48 wherein said second subchannel comprises a slow BCCH (SBCCH).

51. The method of claim 48 wherein said second subchannel comprises an extended BCCH (EBCCH).

52. The method of claim 48 wherein said first subchannel comprises a fast BCCH (FBCCH) and said second subchannel comprises a slow BCCH (SBCCH).

53. The method of claim 48 wherein said first subchannel comprises a fast BCCH (FBCCH) and said second subchannel comprises an extended BCCH (EBCCH).

54. The method of claim 48 wherein said first subchannel comprises a slow BCCH (SBCCH) and said second subchannel comprises an extended BCCH (EBCCH).

55. The method of claim 54 wherein said BCCH subchannels further comprise a fast broadcast control channel (FBCCH).

* * * * *

UNITED STATES PATENT AND TRADEMARK OFFICE
CERTIFICATE OF CORRECTION

PATENT NO. : 5,404,355
DATED : April 4, 1995
INVENTOR(S) : Alex K. Raith

It is certified that error appears in the above-identified patent and that said Letters Patent is hereby corrected as shown below:

In column 27    line 38, change "26" to --29--;
    line 41, change "26" to --29--; and
    line 45, change "26" to --29--.

Signed and Sealed this

Twenty-seventh Day of January, 1998

Attest:

BRUCE LEHMAN

*Attesting Officer*    *Commissioner of Patents and Trademarks*